Patented Aug. 25, 1931

1,820,265

UNITED STATES PATENT OFFICE

LEAVITT N. BENT, OF HOLLY OAK, DELAWARE, AND ALAN C. JOHNSTON, OF KENVIL, NEW JERSEY, ASSIGNORS TO HERCULES POWDER COMPANY, OF WILMINGTON, DELAWARE, A CORPORATION OF DELAWARE

ESTER GUM AND METHOD OF PRODUCING

No Drawing.  Application filed November 24, 1928. Serial No. 321,755.

Our invention relates to ester gum and method of producing, and more particularly relates to ester gum and the method of production by the reaction of a monobasic acid, as abietic acid, simple alcohol containing more than three hydroxyl groups, as pentaerythrite, enneaheptite and erythritol.

Our invention has for its object the production of an ester gum having large molecular structure and consequently great hardness and, at the same time, having desirable elasticity, being clear and having a desirable acid number and melting point.

The ester gum in accordance with our invention is productive of a film which is quick drying and possesses desirable hardness and, at the same time, desirable elasticity to a high degree.

In the production of the ester gum in accordance with our invention, abietic acid is used, preferably substantially pure, though such may be used as found in either wood or gum rosin. Production of the ester gum is effected by reacting on the abietic acid with a simple alcohol containing more than three hydroxyl groups, as a tetrahydric, pentahydric or heptahydric alcohol, as for example, pentaerythrite, $C(CH_2OH)_4$, erythritol, $C_4H_6(OH)_4$, enneaheptite $C_9H_{13}(OH)_7$.

When putting into practice the method in accordance with our invention, reaction between the alcohol and the abietic acid, whether substantially pure, or as present in wood or gum rosin, is effected by heating, for example, to a temperature within about the range 250° C.–280° C., and desirably, though not necessarily, the reaction may be facilitated by the use of a catalyst, as for example, powdered zinc, boric anhydride, or the like.

As a practical illustration of the carrying out of the method in accordance with our invention, for example, 320 parts of rosin, which may be desirably a high grade gum rosin or a purified wood rosin, and 35 parts of pentaerythrite are heated under a reflux condenser at a temperature of, for example, 260° C. to 270° C. for a period of about six hours. During the heating air is excluded from the melt by introducing a current of carbon dioxide. By the reaction a clear gum will be formed which will be found to have an acid number of about 30 and a melting point by the drop method of about 101° C.

As a further illustration of the practical adaptation of the method is accordance with our invention, for example, 320 parts of rosin, which may be either gum or wood rosin, preferably of high grade, are heated with 35 parts of pentaerythrite and 1.5 parts of zinc dust under an air reflux condenser at a temperature within about the range 270° C.–280° C., for about six hours in a current of carbon dioxide. The reaction effected will give a product having an acid number of about 18, melting point of about 96° C. (drop) and having a lighter color than that of the rosin used in a blank run. The reaction may be carried out at a lower temperature, say 225° C., the heating being continued for a longer period.

As a still further illustration, for example, the reaction involved in the carrying out of the method in accordance with our invention, as illustratively described above, may be represented as follows:

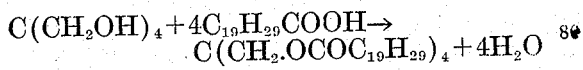

$$C(CH_2OH)_4 + 4C_{19}H_{29}COOH \rightarrow$$
$$C(CH_2.OCOC_{19}H_{29})_4 + 4H_2O$$

In connection with the above illustrations of the practical adaptation of the method in accordance with our invention, as has been indicated, a catalyst may be advantageously used for facilitating the reaction. The use of a catalyst will also have the effect of producing products having lower acid numbers than those indicated, due to more efficient reaction. As a catalyst one may use powdered zinc, boric anhydride, etc.

The ester gum produced by the method in accordance with our invention is a novel product having, as has been indicated, most desirable characteristics, such as hardness, high melting point, elasticity, and clearness.

In connection with the method in accordance with our invention, it will be understood that the proportions of abietic acid, whether substantially pure, or as present in gum or wood rosin, and the reacting alcohol, may be varied over the proportions suggested in the above examples by way of illustration of the practical adaptation of the method; and the temperature of reaction and particular catalyst used may also be varied without departing from our invention. It will also be understood that our invention is not dependent upon the use of any particular form of apparatus and it will be understood that where in the claims appended hereto reference is made to the use of pentaerythrite, we intend to include erythritol as an equivalent.

Having now fully described our invention, what we claim and desire to protect by Letters Patent is:

1. The method of producing an ester gum which includes heating abietic acid with pentaerythrite.

2. The method of producing an ester gum which includes heating rosin with pentaerythrite.

3. The method of producing an ester gum which includes heating wood rosin with pentaerythrite.

4. As a new article of manufacture pentaerythrite abietate.

5. As a new article of manufacture the reaction product of rosin and pentaerythrite.

6. As a new article of manufacture the reaction product of wood rosin and pentaerythrite.

7. The method of producing an ester gum which includes heating abietic acid to a temperature within about the range 250° C.-280° C. with pentaerythrite.

8. The method of producing an ester gum which includes heating rosin to a temperature within about the range 250° C.-280° C. with pentaerythrite.

In testimony of which invention, we have hereunto respectively set our hands, at Wilmington, Del., on this 20th day of November, 1928, and at Kenvil, N. J., on this 22nd day of November, 1928.

LEAVITT N. BENT.
ALAN C. JOHNSTON.